US010415445B2

(12) United States Patent
Decker

(10) Patent No.: US 10,415,445 B2
(45) Date of Patent: Sep. 17, 2019

(54) FORCED AIR EXHAUST DIFFUSER

(71) Applicant: Cummins Inc., Columbus, IN (US)

(72) Inventor: Scott G. Decker, Columbus, IN (US)

(73) Assignee: Cummins Inc., Columbus, IN (US)

( * ) Notice: Subject to any disclaimer, the term of this patent is extended or adjusted under 35 U.S.C. 154(b) by 153 days.

(21) Appl. No.: 15/427,269

(22) Filed: Feb. 8, 2017

(65) Prior Publication Data
US 2017/0145883 A1 May 25, 2017

Related U.S. Application Data

(63) Continuation of application No. PCT/US2015/044458, filed on Aug. 10, 2015.

(60) Provisional application No. 62/035,143, filed on Aug. 8, 2014.

(51) Int. Cl.
| | |
|---|---|
| F01N 13/08 | (2010.01) |
| F01N 3/05 | (2006.01) |
| F01N 3/32 | (2006.01) |
| F01N 9/00 | (2006.01) |
| F01N 3/00 | (2006.01) |
| F01N 11/00 | (2006.01) |

(52) U.S. Cl.
CPC ............ *F01N 3/05* (2013.01); *F01N 3/00* (2013.01); *F01N 3/323* (2013.01); *F01N 9/00* (2013.01); *F01N 11/002* (2013.01); *F01N 13/082* (2013.01); *F01N 2270/02* (2013.01); *F01N 2560/06* (2013.01); *F01N 2900/1404* (2013.01); *Y02T 10/20* (2013.01); *Y02T 10/47* (2013.01)

(58) Field of Classification Search
CPC ........ F01N 3/05; F01N 11/002; F01N 13/082; F01N 3/225; F01N 3/323; F01N 2560/06; F01N 2900/1404

USPC .................... 60/274, 286, 299, 320
See application file for complete search history.

(56) References Cited

U.S. PATENT DOCUMENTS

| | | | |
|---|---|---|---|
| 4,865,010 | A | 9/1989 | Kett |
| 4,912,927 | A | 4/1990 | Billington |
| 6,832,872 | B2 | 12/2004 | Koelm et al. |
| 8,046,989 | B2 | 11/2011 | VanderGriend et al. |
| 8,479,498 | B2 | 7/2013 | Smith et al. |

(Continued)

FOREIGN PATENT DOCUMENTS

| | | |
|---|---|---|
| CN | 101568703 B | 7/2012 |
| EP | 2211038 | 2/2012 |

OTHER PUBLICATIONS

ISA—United States Patent Office, International Search Report and Written Opinion, PCT/US2015/44458, Cummins Inc., dated Jan. 22, 2016, 12 pgs.

(Continued)

Primary Examiner — Jorge L Leon, Jr.
(74) Attorney, Agent, or Firm — Taft Stettinius & Hollister LLP

(57) ABSTRACT

Systems, methods and apparatus are disclosed that include an exhaust system and an air source external to the exhaust system that is configured to force additional air into the exhaust stream downstream of the engine and aftertreatment system to help mix cool air with the exhaust. The amount and timing of the mixing of the forced air with the exhaust can be determined by an electronic controller so that mixing air is provided in response to one or more predetermined operating conditions and/or anticipated operating conditions.

14 Claims, 2 Drawing Sheets

(56) References Cited

U.S. PATENT DOCUMENTS

| | | |
|---|---|---|
| 2008/0087006 A1 | 4/2008 | Wu et al. |
| 2009/0100826 A1 | 4/2009 | Stewart et al. |
| 2009/0139218 A1 | 6/2009 | David et al. |
| 2010/0043430 A1* | 2/2010 | DeHart ............... F01N 3/05 60/605.1 |
| 2011/0179780 A1* | 7/2011 | Sugihara ............ F01N 3/22 60/317 |
| 2011/0283676 A1* | 11/2011 | Reichelderfer ...... F01N 3/323 60/274 |

OTHER PUBLICATIONS

Chinese Office Action, Chinese Application No. 201580047999.8 dated Aug. 24, 2018, 8 pgs.
Chinese Office Action, Chinese Application No. 201580047999.8 dated May 22, 2019, 7 pgs.

* cited by examiner

FORCED AIR EXHAUST DIFFUSER

CROSS-REFERENCE TO RELATED APPLICATIONS

The present application is a continuation of International Application No. PCT/US2015/044458 filed on Aug. 10, 2015, which claims the benefit of the filing date of U.S. Provisional Application Ser. No. 62/035,143 filed on Aug. 8, 2014, each of which is incorporated herein by reference in its entirety.

FIELD OF THE INVENTION

Systems, methods and apparatus are disclosed for cooling exhaust gases at or near the tailpipe using ambient air from an air blower.

BACKGROUND

Under nominal internal combustion engine operating conditions, the temperatures of the exhaust gases leaving the tail pipe are higher than the ambient temperature. This condition is expected due to the combustion event which occurs in the engine. With the addition of aftertreatment systems, the exhaust temperatures must be increased periodically above the exhaust temperatures resulting from nominal engine operations to help maintain the proper operation and efficiency of the aftertreatment system. The duration and increase in temperature above nominal depends on the type of aftertreatment device, the materials used in the construction of the specific aftertreatment device, and the type and amount of contaminants to be removed, among other factors.

The increase in exhaust outlet temperature can impact objects located around the exhaust outlet. Some industries have put significant provisions on engines with aftertreatment systems that require some type of maintenance at elevated exhaust temperatures. In certain locations, temperatures from exhaust systems must be maintained lower than a certain threshold for safety reasons. These systems have to be taken out of service and moved to special locations for monitoring during the elevated exhaust temperature maintenance activity.

Mechanical diffusers have been designed to help mix fresh ambient air with the exhaust air to reduce the temperature of the exhaust. The mixing effectiveness of the air with the exhaust gases is determined by the exhaust flow through the device, hindering the ability to reliably reduce exhaust outlet temperatures below certain exhaust flow thresholds. In addition, mechanical diffusers increase back pressure on the engine, increasing pumping losses and negatively impacting fuel economy. While larger diffusers may mitigate some of these problems, large diffusers increase the footprint and difficulties with packaging.

Other systems cool the exhaust with intake air from the engine, or by injecting air upstream of the aftertreatment systems. The ability to control the exhaust gas temperature in such systems is dependent on the engine operations or the temperature requirements of the aftertreatment system, also hindering the ability to reliably reduce exhaust outlet temperatures below certain thresholds. Therefore, further improvements in controlling exhaust outlet temperatures are needed.

SUMMARY

Systems, methods and apparatus are disclosed that include an exhaust system and an air source external to the exhaust system and intake system that is configured to force additional air for diffusion into the exhaust gas flow downstream of the engine and aftertreatment system to help mix cool air with the exhaust gas flow. The amount and timing of the mixing of the forced air with the exhaust gas flow can be determined by an electronic controller so that the mixing air is provided in response to one or more predetermined operating conditions and/or anticipated operating conditions.

In one embodiment, the timing and amount of air forced into the exhaust gas flow provides exhaust outlet temperatures during aftertreatment maintenance that approximate nominal exhaust temperatures. The air flow can be cooler ambient air that is forced into the exhaust gas flow independently of the intake air flow and the exhaust gas flow, allowing the optimization of the cooling effect on the exhaust gas regardless of engine speed and aftertreatment system temperature requirements.

In a further embodiment, the system includes an air blower connected to the exhaust system downstream of the engine and aftertreatment system with at least one conduit. In one embodiment, the conduit is connected to the tailpipe. As a result, no restriction is added to the exhaust system, therefore backpressure on the engine is not increased and fuel economy is not impacted.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF THE ILLUSTRATIVE EMBODIMENTS

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Figure 1:
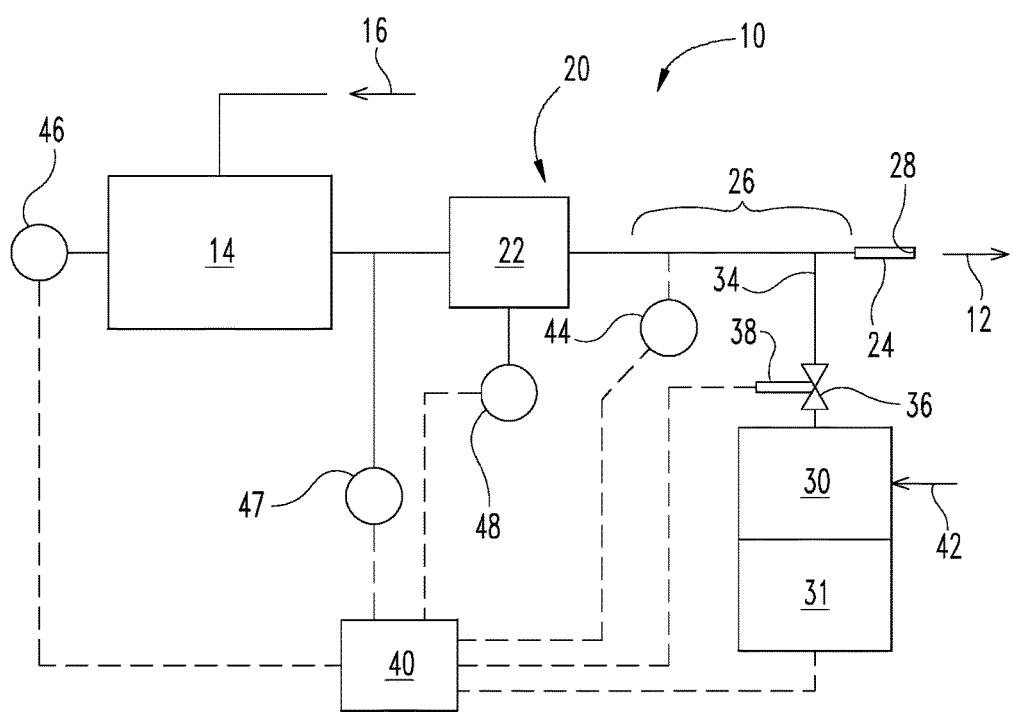
FIG. 1 illustrates a partially diagrammatic view of an exemplary system for controlling exhaust gas temperatures in an exhaust gas outlet region.

Referencing FIG. 1, a system 10 is shown that includes an internal combustion engine 14 that receives an intake flow 16 and fuel and is operable to produce an exhaust gas flow 12 into an exhaust system 20. The exhaust flow 12 includes an amount of exhaust gases that pass through an aftertreatment system 22 to a tailpipe 24 of exhaust system 20. System 10 may be utilized for any application, including at least providing power to a vehicle, providing power for stationary power generation, providing power generation for a motor that powers a vehicle, providing power to a boat, providing power for a pump (e.g. an oil rig pump), providing power to a locomotive, and/or to provide power to any other load. Exhaust system 20 may also include various components not shown, such an exhaust gas recirculation system, a turbocharger system, coolers, and other components connecting exhaust system 20 to the intake system. It should be appreciated that not all details of these systems that are typically present are shown.

The system 10 includes an exhaust outlet region 26 that is located downstream of aftertreatment system 22 that includes tailpipe 24 and extends to an outlet 28. System 10 also includes an air blower 30 connected with exhaust outlet region 26 at one or more locations downstream of aftertreatment system 22 with an air conduit 34. Air blower 30 receives ambient air 42 and operates via a motor 31 to generate a flow of ambient air for mixing with the exhaust gases in exhaust outlet region 26 and/or tailpipe 24. The ambient air 42 is provided independently of the air intake flow 16, engine 14, and exhaust flow 12.

Air conduit 34 may include one or more control valves 36 with an actuator 38 to regulate a positioning of control valve 36 to control an air flow amount through air conduit 34. In other embodiments, air blower 30 may alternatively or additionally include a motor 31 that is capable of varying speeds to control an amount of air flow therethrough. For example, the motor 31 can be a variable speed motor or connected with a variable speed drive.

A controller 40 is operatively coupled to at least one or more sensors, such as an exhaust outlet region sensor 44. The sensor 44 is associated with exhaust outlet region 26 to provide a temperature thereof. Other sensors 46, 47, 48 alternatively or additionally may be provided that are associated with at least one of engine 14, exhaust system 20, and/or aftertreatment system 22, respectively. The sensors may be temperature sensors, speed sensors, or other suitable sensors or combinations of sensors. In addition, any of the sensors may be physical sensor or virtual sensors. In one embodiment, an exhaust outlet region sensor 44 provides a temperature indication to controller 40 of a temperature condition at or near exhaust outlet region 26, such as an ambient temperature outside the exhaust conduit and within a predetermined distance from exhaust outlet region 26.

In certain embodiments, the controller 40 is structured to form a portion of a processing system including one or more computing devices having memory, processing, and communication hardware in operative communication over one or more controller area network (CAN) systems. The controller 40 may be a single device or a distributed device, and the functions of the controller 40 may be performed by hardware or software. The controller 40 may be included within, partially included within, or completely separated from an engine controller (not shown). The controller 40 can also be in communication with any sensor or actuator throughout the systems disclosed herein, including through direct communication, communication over a datalink, and/or through communication with other controllers or portions. In one embodiment, controller 40 is operatively coupled to and provides feedback control of an air amount produced from the air blower 30 in response to the temperature indication from sensor 44 to maintain or drive the temperature associated with exhaust outlet region 26 below a predetermined threshold.

Controller 40 may be configured to provide control commands that regulate the amount, timing, and duration of the air amount provided from air blower 30 to exhaust outlet region 26 to provide an air amount that provides the desired temperature reduction. Accordingly, the controller 40 can be connected to various actuators, switches, sensors, or other devices associated with the production of the exhaust flow from engine 14 and control of the air flow from air blower 30. For example, according to certain embodiments, the controller 40 may be in operable communication with one or more components and/or sensors associated with engine 14 to determine an engine speed or torque output to determine or predict a temperature increase associated with the exhaust flow.

An exemplary controller 40 can be configured for execution of control algorithms that include providing an exhaust cooling command to air blower 30 to provide an ambient air flow amount in response to an exhaust temperature excursion event and/or in response to feedback control of a temperature at or near the exhaust outlet region 26. The ambient air flow amount to be provided can be determined from, for example, equations stored in controller 40 that relate an air flow amount to the temperature reduction amount and other operating conditions, or maps/tables stored in controller 40 which determines an air flow amount to be provided for mixing with the exhaust gases to reduce the exhaust gas temperature by a temperature reduction amount in response to various operating conditions.

The temperature reduction amount, as used herein, may be any one or combination of an amount by which the exhaust gas temperature exceeds a threshold temperature, an amount of exhaust gas pre-cooling to avoid exceeding a temperature threshold in response to an expected exhaust gas temperature increase event, an amount of exhaust gas pre-cooling to limit a subsequent temperature increase to avoid exceeding a temperature threshold, a rate of temperature reduction of the exhaust gas toward a temperature threshold, or any other suitable temperature reduction amount. In another embodiment, the user or operator inputs a user or machine control command to initiate exhaust cooling or to maintain an exhaust temperature at or below a certain threshold based on current or anticipated temperature control requirements.

Figure 2:
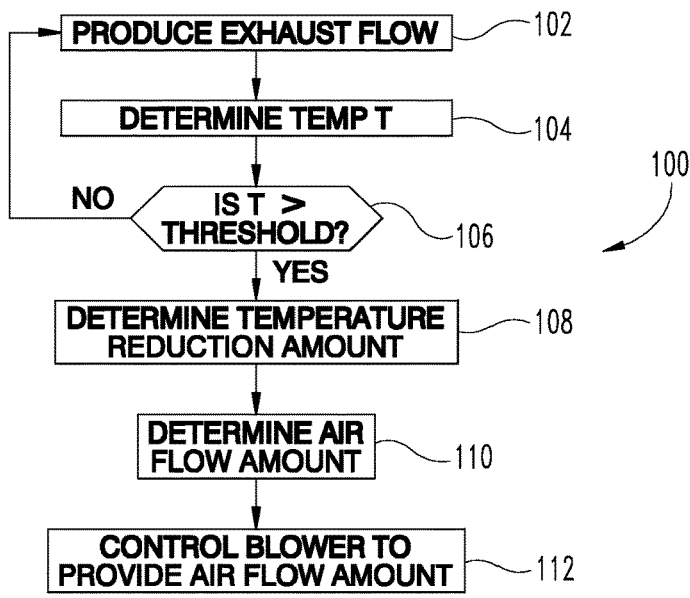
FIG. 2 illustrates a flow diagram according to exemplary controls for an exhaust outlet temperature reduction system.

Further details of several exemplary temperature control techniques for exhaust outlet region 26 shall now be described. With reference to FIG. 2, there is illustrated a flow diagram of an exemplary control routine 100 which may be stored in a non-transitory controller readable memory medium and executed by controller 40 to control operation of an exhaust temperature reduction system such as system 10 described herein or other types of engine systems. Control routine 100 is initiated at operation 102 in which engine 14 is operated to produce an exhaust flow to exhaust system 20.

Control routine 100 continues at operation 104 to determine temperature condition T associated with exhaust outlet region 26. At conditional 106, if temperature condition T is less than a threshold temperature, control routine returns 10 operation 102. If conditional 106 is positive and temperature condition T exceeds the temperature threshold, control routine 100 continues at operation 108 to determine a temperature reduction amount. Control routine 100 then continues at operation 110 to determine an air flow amount to be provided by blower 30 in response to the temperature reduction amount. Controller 40 then provides a control command to control blower 30 to provide the air flow amount at operation 112.

In certain embodiments, the determination of temperature condition T at operation 104 can be a direct measurement of the temperature of exhaust outlet region 26. In other embodiments, the determination of temperature condition T is provided by an indication of a current or anticipated regeneration event associated with aftertreatment system 22. In still other embodiments, the determination of temperature condition T is provided by an indication of a current or anticipated exhaust temperature increase event associated with operation of engine 14, such as a measured or anticipated increase in engine speed, a measured or anticipated increase in torque output, a measured or anticipated increase in fuelling to engine 14, and combinations thereof. In yet other embodiments, the determination of temperature condition T is provided by a manual user input indicating exhaust cooling is required.

The air flow amount determined from operation 110 that is directed into the exhaust gases in response to the temperature reduction amount can be determined in response to one or more desired temperature reduction outcomes. For example, the air flow amount of ambient air can be controlled in response to a temperature reduction amount that is desired to achieve or maintain a target temperature or target temperature range for exhaust outlet regions 26 that is less than the temperature threshold. In one embodiment, the air flow amount of ambient air is directed into the exhaust gases and controlled by adjusting an air flow through or from air blower 30 via motor 31 and directing the air flow amount from the air blower 30 to the exhaust system 20 in exhaust outlet region 26. In a refinement of this embodiment, the air flow amount is controlled by control valve 36 via actuator 38 that allows the control valve 36 to be adjusted to provide the desired air flow amount into the exhaust gases at exhaust outlet region 26. In another refinement, the air flow amount is controlled by controlling a speed of the electric motor of the air blower.

In certain embodiments, there is disclosed a system, method and apparatus that includes air injected directly into the exhaust between the aftertreatment system 22 and the tailpipe 24. There is further disclosed a system, method, and apparatus that directly injects air into the exhaust system 20 independently of and without impacting cooling or air intake characteristics of the engine 14, the cooling or operations of aftertreatment system 22, or any other portion of the system upstream of the aftertreatment system 22. There is also disclosed a system, method and apparatus for cooling exhaust gases independently of any control operations of an aftertreatment system 22 through which the exhaust gas passes.

Figure 3:
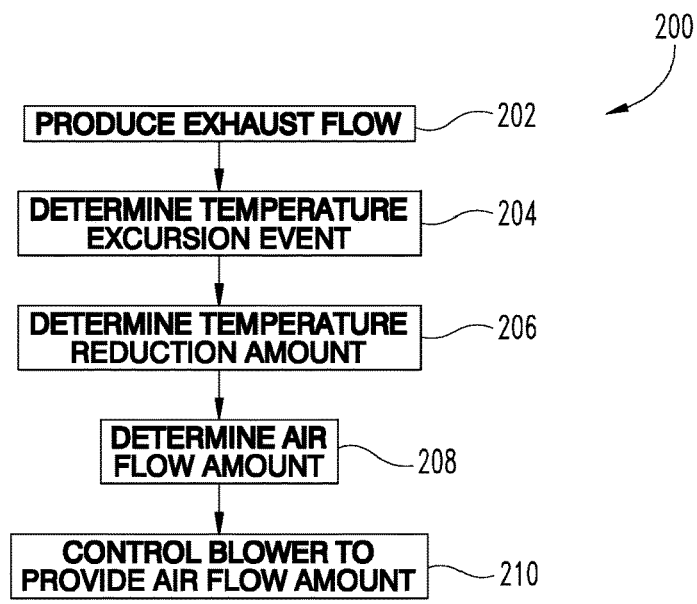
FIG. 3 illustrates a flow diagram according to exemplary controls for another embodiment exhaust outlet temperature reduction system.

There is also disclosed a system, method and apparatus for controlling exhaust gas cooling in response to an exhaust temperature excursion event by directing ambient air into the exhaust between the aftertreatment system 22 and the tailpipe 24. With reference to FIG. 3, there is illustrated a flow diagram of an exemplary control routine 200 which may be stored in a non-transitory controller readable memory medium and executed by controller 40 to control operation of an exhaust temperature reduction system such as system 10 described herein or other types of engine systems. Control routine 200 is initiated at operation 202 in which engine 14 is operated to produce an exhaust flow to exhaust system 20.

Control routine 200 continues at operation 204 to determine an exhaust temperature excursion event. The exhaust temperature excursion event can include any one or combination of an active or imminent regeneration of an aftertreatment component of aftertreatment system 22, an exhaust temperature exceeding or approaching a high temperature threshold, a temperature at or near the tailpipe 24 approaching or exceeding a high temperature threshold, a speed of a vehicle operated by engine 14 approaching or exceeding a threshold, a speed of the engine 14 approaching or exceeding a threshold, a load on the engine 14 approaching or exceeding a threshold, and an operating state of one or more of the engine 14 and the components associated with the engine.

In response to determining the temperature excursion event, control routine 200 continues at operation 206 to determine a temperature reduction amount. Control routine 200 then continues at operation 208 to determine an air flow amount to be provided by blower 30 in response to the temperature reduction amount. Controller 40 then provides a control command to control blower 30 to provide the air flow amount at operation 210.

In each of control routines 100, 200, the determination of the temperature reduction amount and/or the air flow amount can be performed multiple times during the temperature excursion event to adjust the air flow amount as may be needed to respond to varying operating conditions while the air flow amount is being provided. In addition, the temperature determination and/or temperature excursion event determination can be performed multiple times while the air flow is being provided so that the air flow amount that is provided can be continued or terminated as needed.

Various aspects of the disclosure herein are contemplated For example, according to one aspect, a system includes an internal combustion engine and an exhaust system connected to the internal combustion engine to receive an exhaust gas flow produced by operation of the internal combustion engine. The exhaust system includes an aftertreatment system and an exhaust outlet region downstream of the aftertreatment system. The system also includes an air blower fluidly connected to the exhaust outlet region that is operable to provide an ambient air flow for mixing with the exhaust gases in the exhaust outlet region.

In one embodiment, the system includes a controller configured to determine a temperature excursion event associated with the exhaust gas flow and, in response to the temperature excursion event, control the air blower to produce the ambient air flow. In a refinement of this embodiment, the controller is configured to determine a temperature reduction amount and control an ambient air flow amount from the air blower into the exhaust outlet region in response to the temperature reduction amount. In a further refinement, the system includes a control valve in a fluid conduit connecting the air blower to the exhaust outlet region. The controller is connected to the control valve and the controller is configured to modulate the control valve to control the ambient air flow amount in response to the temperature reduction amount. In yet another refinement, the system includes an electric motor associated with the air blower, and the controller is configured to vary a speed of the electric motor to control the ambient air flow amount in response to the temperature reduction amount.

In another embodiment, the ambient air into the air blower is independent of an intake air flow to the internal combustion engine and the exhaust flow produced by the internal combustion engine. In yet another embodiment, the system includes a controller configured to determine a temperature condition of the exhaust outlet region exceeds a temperature threshold and, in response to the temperature condition exceeding the temperature threshold, control the air blower to produce the ambient air flow. In a refinement of this embodiment, the temperature condition is a direct measurement of the temperature of the exhaust outlet region. In another refinement, the controller is configured to determine a temperature reduction amount in response to the temperature condition exceeding the temperature threshold, determine an ambient air flow amount in response to the temperature reduction amount, and control at least one of the air blower and a control valve between the air flow and the exhaust outlet region to provide the ambient air flow amount to the exhaust outlet region.

In another aspect, a method includes operating an internal combustion engine to produce an exhaust gas flow into an exhaust system including an aftertreatment system, a tailpipe downstream of the aftertreatment system, and an exhaust outlet region between the aftertreatment system and the tailpipe; determining a temperature condition associated with the exhaust outlet region exceeds a temperature threshold; producing an ambient air flow with an air blower fluidly connected to the exhaust outlet region; and providing the ambient air flow into the exhaust system at the exhaust outlet region to cool the exhaust gases in the exhaust outlet region.

In one embodiment, the method include determining a temperature reduction amount in response to determining the temperature condition exceeds the temperature threshold; determining an ambient air flow amount in response to the temperature reduction amount; and providing the ambient air flow amount into the exhaust outlet region. In a refinement of this embodiment, providing the ambient air flow amount includes varying a speed of a motor driving the air blower in response to the ambient air flow amount. In a further refinement, providing the ambient air flow amount includes controlling a position of a control valve between the air blower and the exhaust outlet region in response to the ambient air flow amount.

In another embodiment of the method, determining the temperature condition includes directly measuring a temperature of the exhaust outlet region. In yet another embodiment, determining the temperature condition exceeds the temperature threshold includes identifying at least one of an active regeneration event and an imminent regeneration event associated with the aftertreatment system.

According to another aspect, a method includes operating an internal combustion engine to produce an exhaust gas flow into an exhaust system including an aftertreatment system, a tailpipe downstream of the aftertreatment system, and an exhaust outlet region between the aftertreatment system and the tailpipe; determining a temperature excursion event associated with the exhaust outlet region; determining a temperature reduction amount for the exhaust outlet region in response to the temperature excursion event; determining an ambient air flow amount in response to the temperature excursion event; and cooling the exhaust outlet region by producing an ambient air flow with an air blower fluidly connected to the exhaust outlet region to provide the ambient air flow amount into the exhaust system at the exhaust outlet region.

In one embodiment of the method, determining the temperature excursion event includes determining at least one of an active regeneration event and an imminent regeneration event associated with the aftertreatment system. In another embodiment, determining the temperature excursion event includes receiving a manual input indicating exhaust cooling is required.

In a further embodiment, the ambient air flow is produced independently of an intake air flow to the internal combustion engine and the exhaust gas flow from the internal combustion engine to the aftertreatment system. In another embodiment, providing the ambient air flow amount includes controlling a position of a control valve in a fluid conduit connecting the air blower to the exhaust outlet region.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
    an exhaust system to receive an exhaust gas flow produced by operation of an internal combustion engine, the exhaust system including an aftertreatment system and an exhaust outlet region downstream of the aftertreatment system;
    an air blower fluidly connected to the exhaust outlet region, wherein the air blower is operable to provide an ambient air flow amount for mixing with the exhaust gas flow in the exhaust outlet region; and
    a controller configured to determine a temperature reduction amount for the exhaust outlet region in response to an ambient temperature outside of an exhaust conduit of the exhaust system and within a predetermined distance from the exhaust outlet region, wherein the controller is further configured to control the air blower to provide the ambient air flow amount based on the temperature reduction amount.

2. The system of claim 1, wherein the controller is further configured to determine a temperature excursion event associated with the exhaust gas flow and, in response to the temperature excursion event, control the air blower to produce the ambient air flow.

3. The system of claim 2, further comprising a control valve in a fluid conduit connecting the air blower to the exhaust outlet region, wherein the controller is connected to the control valve and the controller is configured to modulate the control valve to control the ambient air flow amount in response to the temperature reduction amount.

4. The system of claim 2, further comprising an electric motor associated with the air blower, wherein the controller is configured to vary a speed of the electric motor to control the ambient air flow amount in response to the temperature reduction amount.

5. The system of claim 1, wherein the ambient air flow amount into the air blower is independent of an intake air flow to the internal combustion engine and the exhaust gas flow produced by the internal combustion engine.

6. The system of claim 1, wherein the controller is further configured to determine the ambient temperature exceeds a temperature threshold and, in response to the ambient temperature exceeding the temperature threshold, control the air blower to provide the ambient air flow amount.

7. The system of claim 1, wherein the controller is configured to control at least one of the air blower and a control valve between the air blower and the exhaust outlet region to provide the ambient air flow amount to the exhaust outlet region.

8. A method, comprising:
    providing an exhaust gas flow into an exhaust system including an aftertreatment system, a tailpipe downstream of the aftertreatment system, and an exhaust outlet region between the aftertreatment system and the tailpipe;

determining an ambient temperature outside of an exhaust conduit of the exhaust system and within a predetermined distance from the exhaust outlet region exceeds a temperature threshold;

determining a temperature reduction amount in response to determining the ambient temperature exceeds the temperature threshold;

determining an ambient air flow amount in response to the temperature reduction amount;

producing the ambient air flow amount with an air blower fluidly connected to the exhaust outlet region; and providing the ambient air flow amount into the exhaust system at the exhaust outlet region to cool the exhaust gases in the exhaust outlet region.

9. The method of claim 8, wherein providing the ambient air flow amount includes varying a speed of a motor driving the air blower in response to the ambient air flow amount.

10. The method of claim 8, wherein providing the ambient air flow amount includes controlling a position of a control valve between the air blower and the exhaust outlet region in response to the ambient air flow amount.

11. The method of claim 8, wherein determining the ambient temperature condition exceeds the temperature threshold includes identifying at least one of an active regeneration event and an imminent regeneration event associated with the aftertreatment system.

12. A method, comprising:

providing an exhaust gas flow into an exhaust system including an aftertreatment system, a tailpipe downstream of the aftertreatment system, and an exhaust outlet region between the aftertreatment system and the tailpipe;

determining an ambient temperature outside of an exhaust conduit of the exhaust system and within a predetermined distance from the exhaust outlet region;

determining a temperature reduction amount for the exhaust outlet region in response to the ambient temperature;

determining an ambient air flow amount in response to the temperature reduction amount; and cooling the exhaust outlet region by producing the ambient air flow amount with an air blower fluidly connected to the exhaust outlet region to provide the ambient air flow amount into the exhaust system at the exhaust outlet region.

13. The method of claim 12, wherein the ambient air flow amount is produced independently of an intake air flow to an internal combustion engine that produces the exhaust gas flow, and also independently of the exhaust gas flow from the internal combustion engine to the aftertreatment system.

14. The method of claim 12, wherein providing the ambient air flow amount includes controlling a position of a control valve in a fluid conduit connecting the air blower to the exhaust outlet region.

* * * * *